United States Patent [19]

Hiroshima et al.

[11] 4,189,749
[45] Feb. 19, 1980

[54] SOLID STATE IMAGE SENSING DEVICE

[75] Inventors: Yoshimitsu Hiroshima, Hirakata; Tooru Takamura, Takatsuki; Hirokuni Nakatani, Takatsuki; Izumi Murozono, Takatsuki, all of Japan

[73] Assignee: Matsushita Electronics Corporation, Kadoma, Japan

[21] Appl. No.: 942,134

[22] Filed: Sep. 13, 1978

[30] Foreign Application Priority Data

Sep. 16, 1977 [JP] Japan ................ 52/111801

[51] Int. Cl.$^2$ .................. H04N 5/21; H04N 5/30; H01L 29/78; H01L 27/14
[52] U.S. Cl. .................. 358/167; 358/213; 357/24; 357/30; 307/311
[58] Field of Search ............ 358/36, 41, 166, 167, 358/212, 213, 285; 328/162, 163, 165, 167; 250/211 R, 211 J, 578; 357/24, 30; 307/221 D, 311; 315/169.2, 169.3

[56] References Cited

U.S. PATENT DOCUMENTS

| 3,737,683 | 6/1973 | Sangster | 57/24 X |
|---|---|---|---|
| 3,856,989 | 12/1974 | Weimer | 358/167 X |
| 4,045,817 | 8/1977 | Nakatani et al. | 358/213 |
| 4,067,046 | 1/1978 | Nakatani et al. | 358/167 X |
| 4,076,986 | 2/1978 | Croisier et al. | 357/24 X |
| 4,145,721 | 3/1979 | Beaudouin et al. | 358/167 X |

*Primary Examiner*—Robert L. Griffin
*Assistant Examiner*—Aristotelis M. Psitos
*Attorney, Agent, or Firm*—Cushman, Darby & Cushman

[57] ABSTRACT

A solid state image sensing device comprising a matrix-disposed photoelectric diodes 27+21, 27+21, .... on a monolithic substrate, wherein each one transferring switching means 24, .... and each one noise eliminating MOS switch 26, .... are provided for each vertical column of said matrix-disposed photoelectric transducing element, and the transferring switches 24, .... twice transfers information on a connecting line 22 of each column to a node point $N_{ST}$ during each horizontal fly-back period, so that the first one of said twice transferring transfers noise signal to the node points $N_{ST}$ for throwing it away, and the second one of said transferring transfers genuine light information of the photodiode 27, ... to the node points $N_{ST}$, .... for outputting the light information, whereby noises such as spurious noise, fixed pattern noise and blooming are eliminated and also scanning speed is improved.

3 Claims, 3 Drawing Figures

SOLID STATE IMAGE SENSING DEVICE

BACKGROUND OF THE INVENTION

Field of the Invention

This invention relates to an improvement in a solid state image sensing device. More particularly, this invention relates to an improvement in a solid state sensing device comprising on a single monolithic substrate a large number of light sensing parts and scanning circuit part for time-sequentially reading out the output signals of the light sensing parts.

The most important characteristic required for a solid state image sensing device is high resolving power, and for the achievement of which MOS-LSI technology becomes widely used since it enables high integration of the device as well as monolithic construction of the light sensing part and scanning circuit part.

FIG. 1 shows one example of the conventional solid stage image sensing device, wherein numeral 1 designates a horizontal scanning circuit which generally is a MOS shift register driven by clock pulses, and numeral 2 designates a vertical scanning circuit which also generally is a MOS shift register driven by clock pulses. These scanning circuits 1 and 2 are generally driven by a 2-phase clock pulses, and the start pulse given to the first stages of the shift registers in the scanning circuits are shifted one by one at specified timings to subsequent stages, thereby sequentially issuing scanning pulse signals to their output lines 3, 3, . . . and 28, 28, . . . , respectively. The horizontal scanning circuit 1 and the vertical scanning circuit 2 thus drive the horizontal MOS switches 23, 23 . . . and the vertical MOS switches 21, 21 . . . in the order of from left to right and from upper to lower, by their output scanning signals, respectively. The output signal of the photo-diodes 27, 27, . . . are taken out through the vertical MOS switches 21, 21, . . . at the lines 22, 22, . . . And the signals at the lines 22, 22 . . . are taken out at the video signal output terminal 35 in turn by the horizontal MOS switches 23, 23 . . . The video signal sent out to the terminal 35 consists of train of pulses, and each of the pulse is produced by a charging current from the power source 36 to the photo-diodes 27. The charging current charges the photo-disode 27 that has been discharging as a result of receiving light for a time period for one frame scanning. The signal thus made by the photo-diode 27 corresponds to the light incident thereon. The video signal, i.e., the charging current is read out as voltage signal across the load resistor 37.

The abovementioned known solid state image sensing device is simple in construction, and therefore can be formed on a semiconductor monolithic substrate by utilizing LSI technology, but has some problems at actual operation.

A first one of such problem of the conventional solid state image sensing device of FIG. 1 is that the video signal produced by the device likely to contain spurious signal or light spurious signal. The reason of containing such spurious signal is as follows: All of the drain electrodes of the vertical MOS switches 21, 21 . . . are connected to respective corresponding vertical lines i.e., connecting lines 22, 22, . . . As already known, in the solid state image sensing device the photo-diodes 27, 27 . . . are generally formed by the source regions of the vertical MOS switches 21, 21 . . . Namely, the source regions per se, which are diffused region of opposite conductivity type to the substrate, region with a p-n junctions inbetween, form the photo-diodes. Therefore, the drain regions have substantially the same construction with the source regions forming the photo-diodes. Accordingly, in case the solid state image sensing device is made compact with high integration and hence the distance between the neighboring sensing elements become extremely short, even though the elements are optically isolated from each other, many carriers are generated by an intense light in the part of the substrate immediately under a source region (photo-diode region) which is shot by the intense light, and part of the carriers reach nearby drain regions around the source region. Thus, the drain regions which are near the intensely illuminated source but do not receive light themselves issue spurious currents.

A second problem of the conventional solid state image sensing device of FIG. 1 is fixed pattern noise. This noise is caused by that, when drain of some of the vertical MOS switch 21 of FIG. 1 has a large dark current failure, signals of all the photo-diodes which are connected to the same vertical line with the defect MOS switch are badly affected, thereby producing white vertical line noise in the monitor picture.

A third problem of the conventional device is that it has a considerable large stray capacitance on the lines 22, 22 . . . , since a large number of drains connected thereto give a considerable large junction capacitance. Therefore, in such conventional devices, it has been difficult to achieve a satisfactory high speed in operating, for example, a large device having 254×244 sensing elements.

SUMMARY OF THE INVENTION

The present invention purports to provide an improved device wherein the abovementioned spurious signal and fixed pattern noise are eliminated and scanning speed is improved.

DETAILED DESCRIPTION OF THE PRESENT INVENTION

Figure 1:
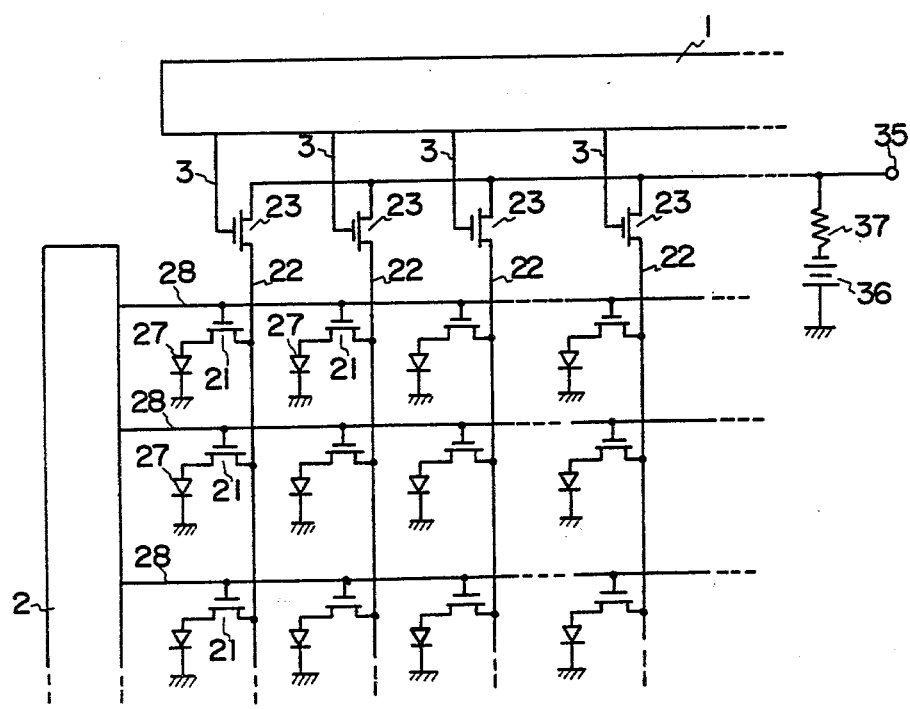
FIG. 1 is a circuit diagram of a conventional solid state image sensing device.
Figure 2:
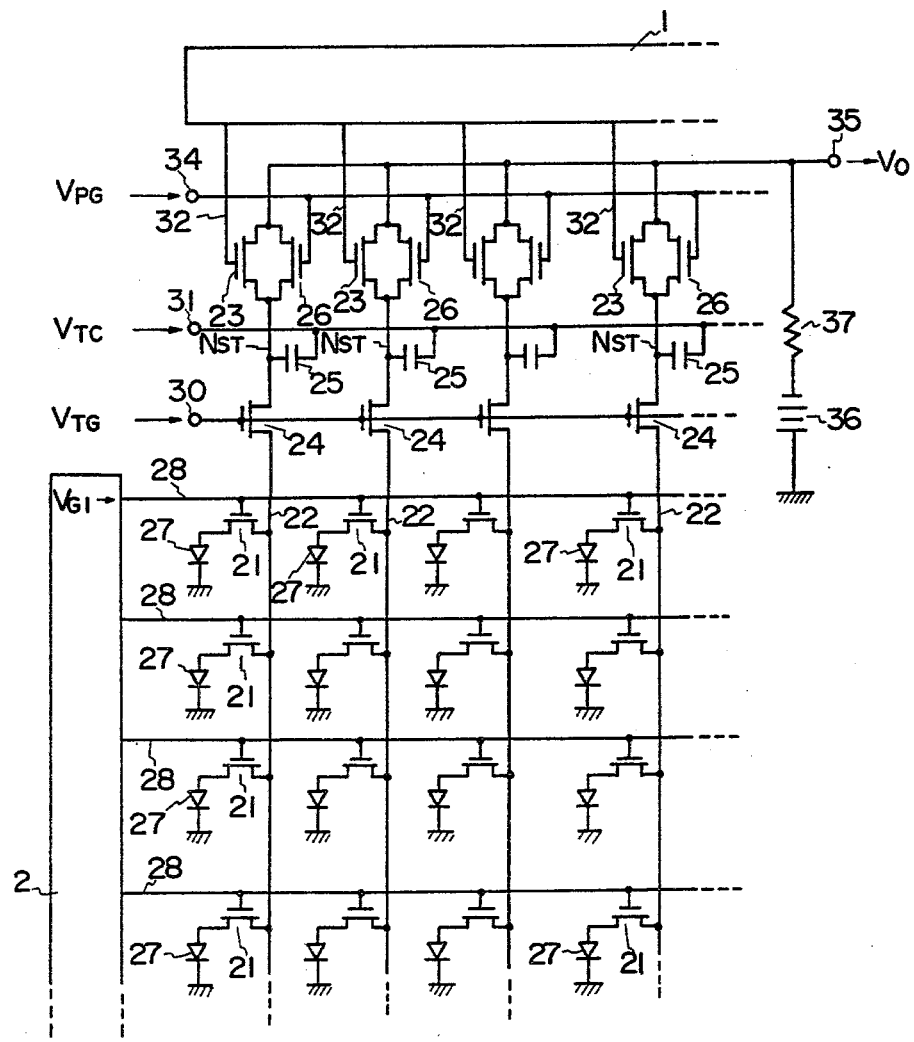
FIG. 2 is a circuit diagram of an example of solid state image sensing device embodying the present invention.
Figure 3:
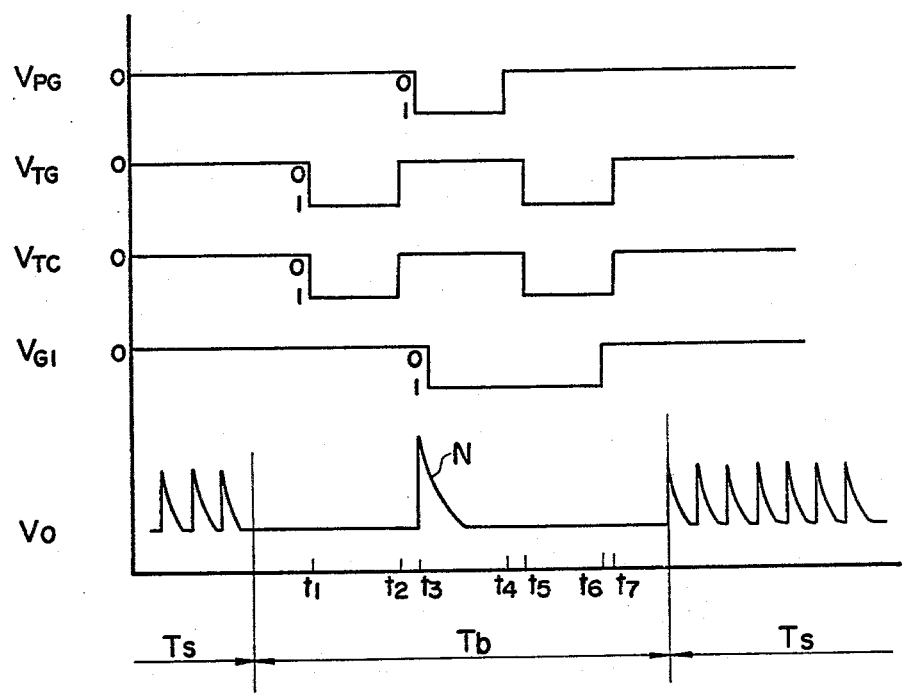
FIG. 3 is a waveform diagram showing waveforms of various parts of the circuit of FIG. 2.

The present invention is elucidated in detail referring to FIG. 2 and FIG. 3 which show construction and waveforms at various parts of the present invention.

The feature of the device in accordance with the present invention is to provide spurious-signal eliminating switches (26, 26 . . . ) and signal transferring means comprising transferring switches (24, 24 . . . ) and transferring capacitors (25, 25 . . . ). The spurious signal eliminating switches are connected, for example in parallel with the horizontal MOS switches (23, 23 . . . ) and the transferring switches (24, 24 . . . ) are connected between busline 22 and the horizontal MOS switches (23, 23 . . . ) respectively, and one side terminals of the transferring capacitors (25, 25 . . . ) are connected to connecting line $N_{ST}$ which is between the transferring switches (24, 24 . . . ) and horizontal MOS switches (23, 23 . . . ) while the other side terminals of the transferring capacitors (25, 25 . . . ) are connected in common to a terminal (31) to which control pulse signals are given.

The detailed circuitry construction of one example of the solid state image sensing device of the present invention is shown in FIG. 2, wherein each image sensing element part comprises a vertical MOS switch 21 and a photo-diode 27 which is connected between the ground and the source electrode of the MOS switch 21. In actual geometric arrangement, the photo-diode 27 is formed by source regions of the MOS switch 21 shaped to receive light. Such image sensing elements are arranged in matrix shape, namely in horizontal rows and vertical columns. For an example, each vertical column consists of 244 elements, and the drain electrodes of their MOS switches 21, 21 . . . are connected in common to a vertical line 22. Each horizontal row consists of 254 elements, and the gate electrodes of their MOS switches 21, 21 . . . are connected in common to a horizontal line, namely a vertical scanning pulse input lines, 28. Since each column has 244 sensing elements, the number of the horizontal lines 28, 28 . . . are 244, and the 244 lines are connected to respective one of 244 output lines of a vertical scanning circuit 2, which issues gate control signals for the MOS switches 21, 21 . . . in sequence from the output terminal at the upper end to that at the lower end.

Since the horizontal row has 254 sensing elements, the number of the vertical lines 22, 22 . . . is 254, and the vertical lines 22, 22 . . . are connected through transferring MOS switches 24, 24 . . . and in series through horizontal MOS switches 23, 23 . . . to the respective output terminals of the horizontal scanning circuit 1, which issues gate control signals for the MOS switches 23, 23 . . . in sequence from the left end output terminal to the right end output terminal.

Capacitors 25, 25 . . . are connected with their one ends to the node points $N_{ST}$, which is between the drains of the MOS switches 24, 24 . . . and the sources of the horizontal MOS switches 23, 23 . . . , and with their other ends to an auxiliary transferring pulse input terminal 31. Noise eliminating MOS switches 26, 26 . . . are connected in parallel to the horizontal MOS switches 23, 23 . . . The gate electrodes of the noise eliminating MOS switches 26, 26 . . . are connected in common to an eliminating pulse input terminal 34. Both drains of the horizontal MOS switch 23, 23 . . . and eliminating MOS switches 26, 26 . . . are connected in common to a video output terminal 35, and also through a load impedance 37 to a D.C. power source 36. Alternately, the drain electrodes of the noise eliminating MOS switches 26, 26 . . . can be connected to other suitable D.C. source terminal, but the abovementioned connection is more simple and sufficient for actual operations.

FIG. 3 shows waveforms of various parts of the circuit of FIG. 2. The belowmentioned elucidation of the operation is made providing that all of the MOS switches 21, 21 . . . , 23, 23 . . . , 24, 24 . . . , 26, 26 . . . are of p-channel enhancement type. However, alternately in case n-channel enhancement type MOS switches are used, then the belowmentioned elucidation of the operation theory is similarly applicable with necessary minor modifications.

Since every rows of the image-sensing element parts have quite the same constructions and connections, the belowmentioned elucidation of operation is made taking one example of 1st (uppermost) row.

The feature of the operation of the present device is that, during each period of the horizontal fly-back, a noise information, which is based on spurious current and dark current of the drain of the MOS switches 21, 21 . . . has been accumulated at a vertical line 22 during the immediately previous horizontal scanning period (,which starts immediately after at ending of the previous horizontal fly-back period and ends immediately before entering into the present horizontal fly-back period), is transferred through a MOS switch 24 to the node point $N_{ST}$ to serve as storing part, by making use of the transferring MOS switch 24 and the transferring capacitor 25 during the time period of from $t_1$ to $t_2$. The transferrings are made for all vertical lines 22, 22 . . . from the leftest node to the rightest node at the same time. In this example the charging of the photo-diode 27 is made by negative charges from the D.C. source 36 through the resistor 37, MOS switches 23/26, 24 and 21. The charging is made stepwise by operations of the MOS switches. In each step of charging, information is transferred in the opposite direction to the flow of the negative charge. By the transferrings, any noise information is cleared from the vertical lines 22. The transferred information at the node points $N_{ST}$ is then cleared away by making the eliminating MOS switch 26 ON for a short time period of from $t_3$ to $t_4$.

Then, after completion of the abovementioned clearings for noise elimination of the lines 22 and the node points $N_{ST}$, a gating signal is given to a selected vertical scanning pulse input line 28, thereby to make the vertical MOS switches 21, 21 . . . connected to the selected line 28 ON. Since the vertical lines 22 has a large capacitance compared to a photo-diode, the photo-diodes 27 in the horizontal line is completely charged to the potential of the former, thereby transferring substantially almost of its light information to the vertical line 22.

Next, genuine light information detected by the photo-diode 27 are transferred from the vertical line 22 to the node point $N_{ST}$ again by making use of the transferring MOS switch and the capacitors 25 during a time period of from $t_5$ to $t_6$. And thereafter, the genuine information transferred to node points $N_{ST}$ are read out in a time sequence by making the horizontal MOS switches 23, 23 . . . ON, thereby obtaining an output video signal at the output terminal 35.

To describe the operation more in detail, the abovementioned operation comprises two steps, namely a first step of clearing noise information from the vertical lines 22, and a second step of, after the clearing step, transferring light information detected by the photo-diodes to the node points $N_{ST}$ of respective vertical column.

The first step, namely the clearing step is as follows: In a horizontal fly-back period Tb, a "1" pulse of $V_{TG}$ is applied from the input terminal 30 to the gates of the transferring MOS switches 24, 24 . . . thereby making them ON. At the same time, "1" pulse of $V_{TC}$ is applied from the input terminal 31 through the transferring capacitors 25 and through the transferring MOS switches 24 to the vertical lines 22, 22 . . . The "1" pulse from the terminal 31 then charges the lines 22, 22 . . . to specified negative voltages, the values of which are dependent on the voltage of the "1" pulse of $V_{TG}$. Thereafter, during a horizontal scanning periods Ts, besides genuine light information, noises from a large number of MOS switches 21, 21 . . . connected to each vertical line 22 accumulate on the line 22 thereby raising their potential. The noises are produced mainly by drains of the MOS switches 21 by dark current failure and by their receiving minority carriers diffused from intensely illuminated photo-diodes. Since the drains are connected to the vertical line 22, these noise information is transferred to the vertical lines 22 even when the gate signals of these MOS switches 21, 21 . . . are "0". Thus, the noise information is always accumulating from many MOS switches 21, 21 . . . which are connected to each vertical line 22. The clearing out operation of the accumulated noise on the vertical line 22 is made by impressing "1" pulse (a negative pulses) $V_{TG}$ shown in FIG. 3 on the gate input terminal 30 for a time period of from $t_1$ to $t_2$, and at the same time impressing "1" pulse (a negative pulse) $V_{TC}$ shown in FIG. 3 on the transferring input terminal 31. The voltage values of these pulse signals $V_{TG}$ and $V_{TC}$ are so selected that the transferring MOS switches 24, 24 . . . operated always in their saturation range. As a result of the impression of the pulse signal $V_{TC}$ on the terminal 31, the node points $N_{ST}$ are made to have a considerable negative potential of $$V_{36} + \alpha \cdot V_{TC},$$

where $V_{36}$ is the voltage of the D.C. voltage source 36, $\alpha$ is a constant of $0 < \alpha < 1$, which is determined by the capacitances of the transferring capacity 25 and the stray capacitance of the node point $N_{ST}$, and $V_{TC}$ is the voltage of the pulse $V_{TC}$.

At the same time, since the pulse $V_{TG}$ is impressed on the terminal 30, all the MOS switches 24, 24 . . . are made ON for the same time period, and according to the saturation characteristic of MOS switches 24, 24 . . . the vertical lines 22 are charged to the potential of $$V_{TG} - V_{Th},$$

provided that $|V_{36} + V_{TC}| > |V_{TG} - V_{Th}|$, where $V_{TG}$ is the voltage of the pulse signal $V_{TG}$ and $V_{Th}$ is the threshold voltage of the MOS switch 24.

Then, at the time of $t_2$ when the pulse signals $V_{TC}$ and $V_{TG}$ fall to "0", all the MOS switches 24 become OFF, and accordingly the potentials of the node points $N_{ST}$ are raised (i.e., nears to $V_{36}$ from more negative potential).

During the abovementioned period from $t_1$ to $t_2$ when the transferring MOS switches 24, 24 . . . are ON and at the same time a pulse $V_{TC}$ is impressed on the terminal 31, negative charges $\Delta Q_1, \Delta Q_2$ . . . are transferred from the node points $N_{ST}, N_{ST}$ . . . to the lines 22, 22 . . . , and accordingly the potentials of the node points $N_{ST}, N_{ST}$ . . . are raised. Immediately after $t_2$ the potentials of the node points $N_{ST}, N_{ST}$ . . . become slightly higher than $V_{36}$ by the extent responding to the amount of the abovementioned charges. This means that the noise information is transferred to the node points $N_{ST}, N_{ST}$ . . . The transferrings are carried out in the similar manner as in a known bucket brigade device (BBD).

Thus, the noise information accumulated on the line 22 is cleared out by transferring from the line 22 to the node point $N_{ST}$. In other words, this transferring is equivalent with a transferring of a part of electric charge of a composite capacity consisting of stray capacity between each node point $N_{ST}$ and the substrate and a capacity 25 to the connecting line 22. Therefore, here, the abovementioned composite capacity can be regarded as the capacity of the node point $N_{ST}$. In the actual device the capacitance of the capacity 25 is far greater than the stray capacity, and therefore, substantially it can be said that the transferring of the electric charge is made from the capacity 25 to the connecting line 22.

The capacity values of each node point $N_{ST}$ is enough with only a fraction of those of each line 22 since it only serves to supply a charge which cancel out the discharge amount by one photo-diodes 27 belonging to the column of a line 22 or spurious discharge on the line 22. The capacity value of the transferring capacitor 25, 25 . . . is enough with such values that enables operation of the transferring MOS switches 24, 24 . . . in saturation range. The actual value of the capacity for such operation is, for example around twice of that of each node point $N_{ST}$. In one example having photoelectric elements of 254 (in the horizontal row)×244 (in the vertical column) pieces, a satisfactory transferrings are observed with the capacitances of the node points $N_{ST}$ being 5 times of those of the junction parts of the photo-diodes 27.

Next, after the abovementioned clearing out, during the time from $t_3$ to $t_4$, a pulse signal $V_{PG}$ shown in FIG. 3 is impressed on the terminal 34, thereby to make the eliminating MOS switches 26, 26 . . . ON. The pulse signal $V_{PG}$ has preferably a voltage higher (in negative direction) than the voltage to make the MOS switches 26, 26 . . . in non-saturated (triode like) operation, so that all the node points $N_{ST}, N_{ST}$ . . . are re-charged almost to the voltage of the D.C. source $V_{36}$. By the ON states of the MOS switches 26, 26 . . . , the noise information previously transferred to the node points $N_{ST}$ is further transferred and taken out to the output terminal 35, thereby issuing spurious i.e., noise signal to the terminal 35. However, since the time period is now in the fly-back period, this spurious signal does not make harmful effect in the video picture.

The second step, namely the genuine signal transferring step is as follows:

After opening (OFF) of the MOS switches 24, 24 . . . , and before the next opening (OFF) of the MOS switches, namely, between the time of $t_2$ and $t_7$, a vertical scanning pulse $V_G$ (for example $V_{G1}$) is impressed on a selected line 28 (for example of the uppermost row) from the vertical scanning circuit 2. In the operation example of FIG. 3, the vertical scanning pulse $V_{G1}$ is impressed during the time period from $t_3$ to $t_6$ which is within said $t_2$–$t_7$ period. Then, the MOS switches 21, 21, . . . connected to the selected vertical scanning line 28 become simultaneously ON, thereby transferring the video signal information of the photo-diodes 27, 27 . . . to the vertical lines 22, 22 . . . , which have been cleared out of the spurious signals immediately before this transferring.

In the same manner as already elucidated concerning the clearing step, the genuine video signal information which have been transferred to the lines 22, 22 . . . are further transferred to the node points $N_{ST}$ by second application of the pulse signals $V_{TG}$ and $V_{TC}$ to the terminals 30 and 31, respectively, for the time period of $t_5$ to $t_7$. At the same time, during a time period of $t_5$ to $t_7$, the transferring MOS switches 21, 21, . . . in the selected horizontal row are ON, and accordingly, not only the vertical line 22, but also the photo-diode 27 connected to the selected vertical scanning line 28 are charged to the potential of $V_{TG}$-$V_{Th}$ by the pulse $V_{TC}$ impressed on the terminal 31.

As is described in the above, the transferring of the noise information or genuine information is made simultaneously of all the photo-diodes 27, 27 . . . in the same horizontal row during a horizontal fly-back period, and the genuine information is stored in the node points $N_{ST}, N_{ST}\ldots$. Thereafter they are subsequently read out after the time of $t_7$, namely after the fly-back period, in sequence from the left node point to the right node point one by one under driving by the horizontal scanning signals which are sequentially issued from the horizontal scanning circuit 1 to the horizontal scanning input lines 32, 32... By the reading-outs of the genuine information of the node points $N_{ST}, N_{ST}\ldots$, their potentials are restored exactly to the value of $V_{36}$ which is of the D.C. source voltage 36.

Thus genuine video signal $V_0$ is read out as shown in FIG. 3. A high peak "N" on the curve $V_0$ corresponds to spurious information, and the peak "N" can be completely eliminated from the video signal by a known blanking.

Since every reading, i.e., transferring of the light information is made immediately after cleaning out of all vertical lines 22, 22..., there is almost no time for accumulating noise signal on the vertical line before the reading. Therefore, there is almost no possibility of including noise signal or fixed pattern noise due to inuniformity of the drain leakage currents of the vertical MOS switches.

In the device of the present invention, the operation can be made that the charged voltage of the photo-diode is dependent on the voltage applied to the gates of the transferring MOS switch 24, 24... only, but not on the voltage $V_{36}$ of the D.C. source voltage 36. Therefore, it is possible to design the device so as to use a widely used $-5$ V D.C. power source as the power source 36 and to select a desired bias-voltage (e.g. $-3$ V to $-15$ V) across the photo-diodes 27, 27... in order to achieve an optimum photoelectric transducing characteristics.

Furthermore, since the transferring MOS switches 24, 24... are used both for elimination of the noise information and for reading the genuine light information, scattering of their threshold value $V_{Th}$ due to inuniformity of the process parameters can be minimized. This leads to that even a small variation of the charge can be precisely detected.

Since the noise information originated from minority carrier diffusion to the drain regions of the MOS switches can be completely eliminated by the clearing out step, thereby enabling to obtain a video signal free from the vertical line noise, then the SN ratio of the video signal can be drastically improved.

In the present device, the vertical connection lines 22, 22..., each of which is connected to a large number of drains of MOS switches 21, 21..., which gives considerable large stray capacitance, are isolated from the horizontal scanning MOS switches 23, 23... by the transferring MOS switches 24, 24.... Therefore, the horizontal scanning of a very high speed is possible irrespective of the large capacitance of the vertical connection lines 22, 22...

An example device embodying the present invention, having the image sensing elements of 254 (in horizontal row) $\times$ 244 (in vertical column), having the circuit construction of FIG. 2, and operated as shown in FIG. 3, shows a drastic improvement in blooming characteristic and such a high S/N ratio of over 40 dB. It is also observed that the example device can operate with high stability at such a high scanning speed of 5 MHz.

What we claim is:

1. A solid state image sensing device comprising:
    a group of a large number of photoelectric transducing elements disposed in a matrix with horizontal rows and vertical columns of said photoelectric transducing elements,
    a plurality of vertical metal-oxide semiconductor (MOS) switches each one of the vertical MOS switches connected to each of said photoelectric transducing elements,
    a plurality of vertical scanning pulse input lines one vertical scanning pulse input line for each of said horizontal rows, each vertical scanning pulse input line being connected to the gates of said vertical MOS switches in common,
    a plurality of connecting lines one connecting line for each of said vertical column, each connecting line being connected to the drains of said vertical MOS switches in said vertical column in common,
    a plurality of transferring MOS switches one transferring MOS switch for each of said connecting line, the source of each transferring MOS switch being connected to said connecting line,
    a transferring-pulse input line, to which the gates of said transferring MOS switches are connected in common,
    a plurality of capacitors one capacitor for each of said transferring MOS switch, one end of the former being connected to each drain of the latter,
    an auxiliary-transferring-pulse input line to which the other ends of each capacitor are connected in common,
    a plurality of horizontal scanning MOS switches one horizontal scanning MOS switch for each of said transferring MOS switch, the sources of the former being connected to the drains of the latter, respectively, and the drains of the former being connected in common to a video signal output terminal,
    a plurality of noise eliminating MOS switches one noise eliminating MOS switch for each of said transferring MOS switch, the source of the former being connected to the drain of the latter, the drains of the former being connected in common to a terminal, and
    a noise eliminating pulse input line to which the gates of said noise eliminating MOS switches are connected in common.

2. Apparatus for operating solid state image sensing device, said solid state image sensing device comprising:
    a group of a large number of photoelectric transducing elements disposed in a matrix with horizontal rows and vertical columns of said photoelectric transducing elements,
    a plurality of vertical metal-oxide semiconductor (MOS) switches each one of the vertical MOS switches connected to each of said photoelectric transducing elements,
    a plurality of vertical scanning pulse input lines one vertical scanning pulse input line for each of said horizontal rows, each vertical scanning pulse input line being connected to the gates of said vertical MOS switches in common,
    a plurality of connecting lines one connecting line for each of said vertical column, each connecting line being connected to the drains of said vertical MOS switches in said vertical column in common,
    a plurality of transferring MOS switches one transferring MOS switch for each of said connecting line, the source of each transferring MOS switch being connected to said connecting line, a transferring-pulse input line, to which the gates of said transferring MOS switches are connected in common, a plurality of capacitors one capacitor for each of said transferring MOS switch, one end of the former being connected to each drain of the latter, an auxiliary-transferring-pulse input line to which the other ends of each capacitor are connected in common, a plurality of horizontal scanning MOS switches one horizontal scanning MOS switch for each of said transferring MOS switch, the sources of the former being connected to the drains of the latter, respectively, and the drains of the former being connected in common to a video signal output terminal, a plurality of noise eliminating MOS switches one noise eliminating MOS switch for each of said transferring MOS switch, the source of the former being connected to the drain of the latter, the drains of the former being connected in common to a terminal, and a noise eliminating pulse input line to which the gates of said noise eliminating MOS switches are connected in common, said apparatus being characterized by further comprising:

a transferring-pulse generating means and an auxiliary-transferring-pulse generating means, each of which issues two transferring pulses in sequence during each fly-back period of horizontal scanning, and which gives said two pulses simultaneously to said transferring-pulse input line and auxiliary-transferring-pulse input line, respectively, a noise-eliminating pulse generating means which issues each one pulse to said noise-eliminating pulse input line, at a time between said two pulses, a horizontal scanning pulse generating means which gives horizontal scanning pulses in sequence to respective control electrodes of said horizontal switching means during each horizontal scanning period, and a vertical scanning pulse generating means which gives vertical pulses in sequence to respective vertical scanning pulse input line, each of said vertical scanning pulse is issued during each horizontal fly-back period and after each completion of a first one of said two transferring pulses.

3. Method of operating solid state image sensing device, said solid state image sensing device comprizing:

a group of a large number of photoelectric transducing elements disposed in a matrix with horizontal rows and vertical columns of said photoelectric transducing elements, a plurality of vertical metal-oxide semiconductor (MOS) switches each one of the vertical MOS switches connected to each of said photoelectric transducing elements, a plurality of vertical scanning pulse input lines one vertical scanning pulse input line for each of said horizontal rows, each vertical scanning pulse input line being connected to the gates of said vertical MOS switches in common, a plurality of connecting lines one connecting line for each of said vertical column, each connecting line being connected to the drains of said vertical MOS switches in said vertical column in common, a plurality of transferring MOS switches one transferring MOS switch for each of said connecting line, the source of each transferring MOS switch being connected to said connecting line, a transferring-pulse input line, to which the gates of said transferring MOS switches are connected in common, a plurality of capacitors one capacitor for each of said transferring MOS switch, one end of the former being connected to each drain of the latter, an auxiliary-transferring-pulse input line to which the other ends of each capacitor are connected in common, a plurality of horizontal scanning MOS switches one horizontal scanning MOS switch for each of said transferring MOS switch, the sources of the former being connected to the drains of the latter, respectively, and the drains of the former being connected in common to a video signal output terminal, a plurality of noise eliminating MOS switches one noise eliminating MOS switch for each of said transferring MOS switch, the source of the former being connected to the drain of the latter, the drains of the former being connected in common to a terminal, and a noise eliminating pulse input line to which the gates of said noise eliminating MOS switches are connected in common, said method being characterized by:

transferring spurious signals from said connecting lines to said capacitors by impressing a first pulses during each fly-back period of horizontal scanning simultaneously on transferring-pulse input lines and auxiliary transferring pulse input lines, eliminating said transferred spurious signals by further transferring them from said capacitors through said noise eliminating switches to said one terminal, transferring at a same time signals of said photoelectric transducing elements through said vertical transfer MOS switches to said capacitors by impressing a second pulse after said eliminating of spurious signals simultaneously on transferring pulse input lines and auxiliary transferring pulse input lines, and impressing a vertical scanning pulse to selected one of said vertical scanning pulse input line at the time during each horizontal fly-back period and after each completion of said first pulse, and taking out said signals stored in said capacitor to said video output terminal in sequence during subsequent horizontal scanning period.

* * * * *